United States Patent Office 3,387,446
Patented June 11, 1968

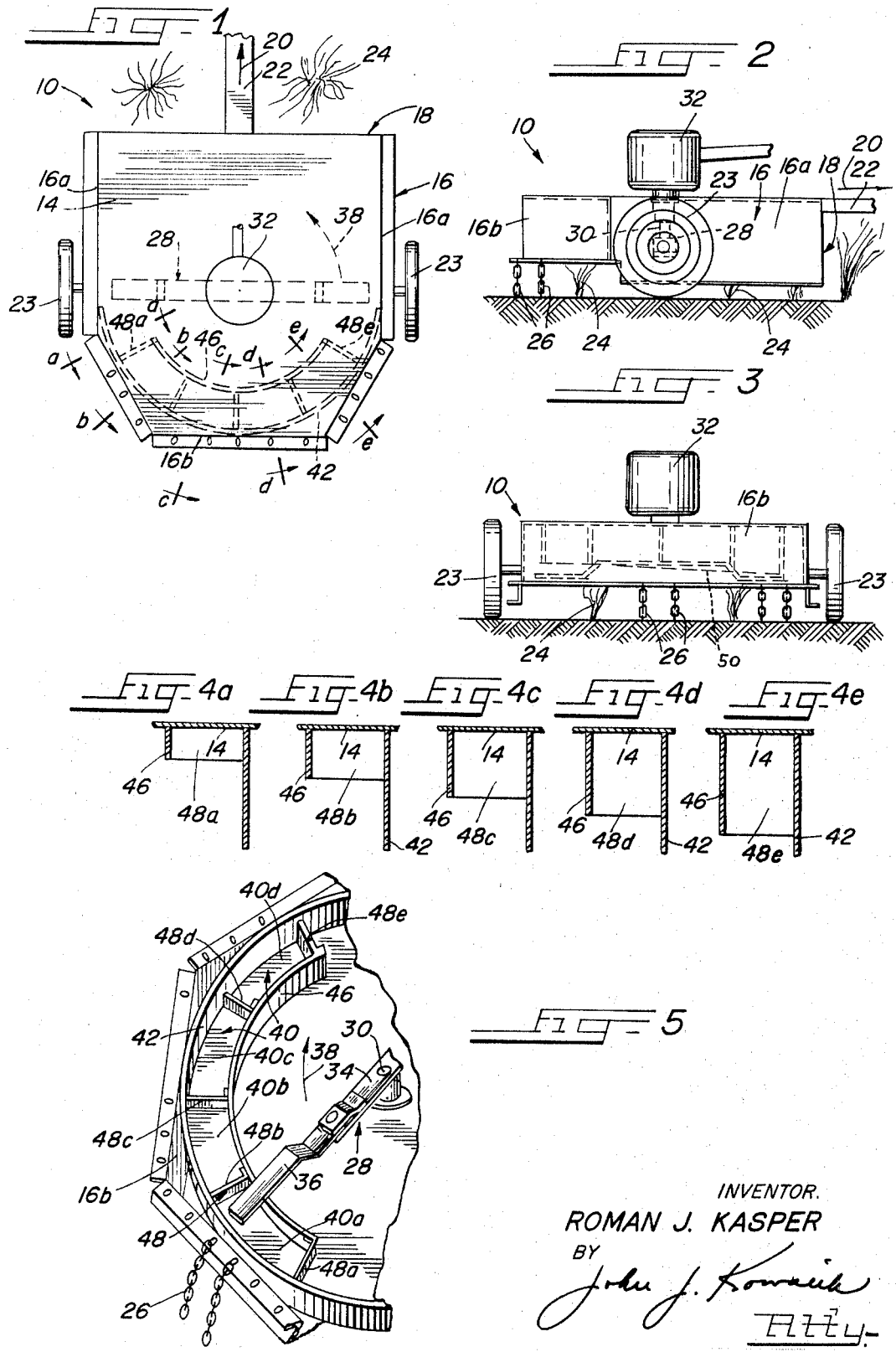

3,387,446
ROTARY PLANT CUTTER AND METHOD
OF CUTTING
Roman J. Kasper, Downers Grove, Ill., assignor to International Harvester Company, Chicago, Ill., a corporation of Delaware
Filed Mar. 22, 1965, Ser. No. 441,674
9 Claims. (Cl. 56—503)

ABSTRACT OF THE DISCLOSURE

A rotary cutter having a blade rotatable in a generally horizontal plane and passing under a succession of progressively lengthened vertical webs.

The present invention relates to a rotary plant cutter for use in cutting and shredding plants or plant stalks, and more particularly those plants or stalks that are difficult to cut and shred, such as cotton plants, although the invention is not restricted thereto.

Cotton plants are extremely tough and exceedingly difficult to shred, or cut into relatively small pieces, or comminute, to the desired degree, so as to eliminate obstruction to later plowing the ground on which they are left.

A principal object of the invention is to provide a novel cutter which is effective for overcoming the above difficulties, and which is specifically particularly effective for cutting, shredding and generally comminuting tough plants.

Another object is to provide a cutter of the foregoing general character and which includes specifically a housing disposed over the plants to be cut, and a rotary blade operating in the housing, wherein novel construction is provided for establishing a retarding action in the discharge of the plants from the housing after being cut and thereby subjecting the plants to increased and more intense cutting action by the rotary blade, whereby to produce the increased comminuting action referred to.

A more specific object is to provide a cutter of the character just referred to in which the housing is provided with a series of pockets which tend to cause bunching of the plants in the housing, and thereby set up the retarding action to the discharge of the plants from the housing.

Still another object is to provide a novel cutter of the character just referred to wherein the pockets mentioned are of increasing depth successively in the direction of rotation of the rotary blade whereby the retarding action exerted on the plants is gradually increased, with a corresponding gradual increase in the cutting action of the rotary blade on the plants.

A further object is to provide a cutter of the foregoing character which is of relatively simple, but rugged and strong design.

Other objects and advantages of the invention will appear from the following detailed description taken in conjunction with the accompanying drawings wherein:

FIGURE 1 is a plan view of rotary cutter made according to the present invention;

FIGURE 2 is a side elevational view, taken from the right of FIGURE 1;

FIGURE 3 is a rear elevational view, taken from the end of FIGURE 1 nearest the observer;

FIGURES 4a, 4b, 4c, 4d, 4e are a series of sectional views and taken respectively at lines a—a, b—b, c—c, d—d, and e—e, of FIGURE 1; and FIGURE 5 is a perspective view of the under side of the cutter, and taken approximately in the direction of the arrow 5 of FIGURE 3.

Referring now in detail to the drawings attention is directed first to FIGURES 1, 2, and 3 which show the cutter of the invention indicated generally at 10. The cutter includes a housing 12 which also serves as the main frame of the cutter. This housing includes a top element 14 in the form of a plate, and a depending flange 16 extending on three sides, including elements 16a on the sides and an element 16b at the rear. The front end of the housing 12, indicated at 18, is open, the cutter being arranged for normally moving in the direction indicated by the arow 20. The housing 12 may be constructed from sheet metal and then fabricated to shape, or made of plate and with the various elements welded together, or even made as a casting.

A tongue 22 is provided for pulling by a tractor, for example, in the normal use thereof, the device including wheels 23. Upon normal operation of the cutter the cotton plants 24, or other plants to be cut, pass through the open end 18 of the housing, relatively speaking, and are subjected to the cutting, shredding, and comminuting action, as described hereinbelow. A safety shield series of chains or equivalent flexible elements 26 are secured to the rear flange element 16b to confine the plants after being cut and prevent their being too widely scattered.

A cutter blade 28 is mounted on a vertical shaft 30 and rotated by a power take-off arrangement from the tractor, as indicated at 32, or by an engine mounted on the device as desired.

The cutter blade 28 is of known kind, having a central rigid bar element 34 (see FIGURE 5) directly mounted on the shaft 30, and end blade elements 36 pivoted on vertical axes.

In the normal operation of the cutter, the blade is rotated in the direction of the arrow 38, counterclockwise as viewed in FIGURE 1, and clockwise as viewed in FIGURE 5.

The cutter blade 28 is of such length preferably as to extend substantially the full width of the housing, between the side flange elements 16a, and the housing 12 is so shaped and proportioned that the cutter blade also extends to a point closely adjacent the rear end of the housing, closely adjacent the rear flange element 16b. The overall size of the device may be as desired, but a size sufficient to accommodate two rows of plants has been found practical and efficient.

FIGURE 1 indicates and FIGURE 5 shows the series of pockets referred to above which provide the retarding action on the plants being cut. These pockets are indicated generally at 40 and individually identified as 40a, 40b, and 40c and 40d which as will be noted and described in detail hereinbelow are of different depths, increasing in depth in the order identified.

These pockets 40 are defined on one side by a depending wall element 42 semi-circular in shape and disposed at the rear end of the housing closely adjacent the rear flange element 16b. The depending wall element 42 is rigidly secured to the top plate element 14 of the housing as by welding, for example, or by providing a flange on the wall element and riveting it to the top element. The ends of the wall element 42 may be secured to the side flange element 16a, as by riveting. The wall element 42 and rear flange element 16b may be of any desired depth.

The pockets 40 are defined on their inner sides by an inner wall element 46 rigidly secured to the top plate element 14 of the housing and depending therefrom. This inner wall element 46 is also of semicircular shape and spaced inwardly from the outer wall element 42 a desired distance to provide the pockets 40 with the intended dimension in that direction. The wall element 46 may be secured to the top plate element in a manner similarly to the outer wall element 42. This inner wall element 46 gradually increases in depth in the direction of rotation of the cutter blade 28, as referred to again hereinbelow.

The pockets 40 are defined on their other sides by a series of depending vanes 48 individually identified as 48a, 48b, 48c, 48d and 48e, increasing in depth in the order identified. These vanes are disposed preferably radially and are secured to and between the outer wall element 42 and inner wall element 46, and the top plate element 14 in any suitable manner, such as by welding, or by providing flanges on the vanes and riveting them to the corresponding other elements. The wall elements and the vanes, being all rigidly secured to the top plate element and to each other, provide an extremely strong and rigid construction to withstand the intense forces encountered in the cutting and comminuting action on the plants, the arrangement substantially preventing any rupture of the top plate element 14 or other parts of the housing.

The pivoted end elements 36 of the cutter blade extend into the zone of the pockets 40, and nearly to the outer periphery thereof, in the cutting action. The cutter blade is disposed to operate in a plane substantially parallel with the top plate element 14 of the housing, and the pivoted end elements 36 thereof which perform the actual cutting action, and which are offset downwardly from the center bar element 34, are adjacent the bottom edge of the housing, and preferably above the bottom edge of the rear wall element 42, although the height of the blade is not critical, the action being effective even with the blade disposed effectively below the bottom edge of the housing. However the preferred position of the blade is that in which the pivoted end elements 36 are closely adjacent the lower edge of the deepest vane 48e and thus the greatest depth dimension of the inner wall element 46 and pocket 40d. The dot-dash line 50 indicates the inclination of the lower edges of the vanes 48, and of the inner wall element 46, which as will be noted is disposed at an acute angle to the plane of operation of the cutter blade.

The cutter blade 28, as is common in cutters of this general type, rotates at a rapid rate and the pivoted end elements 36 by centrifugal force tend to extend directly outright, and in the normal course of action in the present instance are not deflected rearwardly to any appreciable extent in the intense cutting and comminuting action. However in the event of unusual obstruction, these end elements are enabled to yield and prevent breakage that might otherwise occur.

In the operation of the cutter as the cutter passes along rows of plants 24 as indicated in FIGURE 2, and the plants subjected to the action of the cutter blade 28, a cutting section is exerted at the fore part of the housing but the greater cutting action is exerted at the rear part thereof in conjunction with the vanes 48 and pockets 40. All of the elements depending from the rear end of the housing tend to retain the plants within the housing, and do retain them for a significant period of time, i.e. there is a dwell and a bunching up of the plants at this end of the housing. At this point in the housing the cutting action of the cutter blade has greater effect because of the repeated incidents of engagement of the blade with the plants. These plants, or portions of them, in so bunching up are worked into the pockets 40, and a turbulent and twisting and tumbling action is accomplished by the cutter blade working on the plants in conjunction with the vanes and the pockets. The first portion of that action is in conjunction with the shallow pocket 40a, this being the first pocket in the series relative to the direction of the rotation of the cutter blade. A certain degree of the tumbling and twisting action is accomplished in this shallow pocket, and the plants, or portions of them, then proceed or progress into the next pocket 40b which is deeper and produces correspondingly greater tumbling and twisting action and this with correspondingly greater cutting and comminuting effect. This action is repeated at the successive pockets with more intense action in each pocket than in the preceding pocket so that at the end of the progression the action is quite intense. This action is intensified both by the depth of the pocket itself, the greater depth tending to provide a greater retarding action, and by the greater proximity of the cutter blade to the bottom open side of the pocket. In other words the greater retention of the plants in the pocket together with the proximity of the blade thereto provides an extremely great cutting, shredding and comminuting action. The stalks of the plants are split open to a much greater degree and they are also cut into shorter lengths.

Added increments of stalks and particles of stalks that enter into each of the pockets tend to displace other particles therefrom so that the particles in each of the pockets partake of a constantly changing composition with new particles constantly entering into the pockets and old particles constantly being discharged therefrom. As the particles of the plant stalks are proceeding through this changing nature by turning over, they are repeatedly acted on by the cutter blade a greater number of times than would be the case without the pockets.

It will be appreciated that the cutter blade engages the stalks a large number of times, considering the fact that it is rotated at a great speed relative to the rate of movement of the cutter along the ground.

While I have herein shown a preferred embodiment of the invention it will be understood that changes may be made therein within the scope of the appended claims.

I claim:

1. A cutter of the character disclosed, comprising a housing with a lower open side and adapted for movement along a line of plants, a cutter blade mounted in the housing for rotation on a vertical axis, said housing having a depending flange at least on the trailing end thereof relative to the direction of movement thereof, the housing also having a plurality of depending vanes adjacent the rear end thereof and inwardly of said depending flange, said vanes being disposed generally radially to the axis of rotation of said cutter blade and thus being disposed in a line of succession immediately above the path of movement of the ends of the cutter blade, said vanes varying in depth relative to each other.

2. The invention set out in claim 1 wherein said vanes are of increasing depth successively in the direction of rotation of said cutter blade.

3. A rotary cutter comprising a housing adapted for movement along a line of plants and having a normal operative position and when in such position having a lower open side and an open front end, a rotary cutter blade in said housing disposed on a vertical axis, the housing having a plurality of downwardly opening pockets therein disposed in a circular path and positioned so that the cutter blade when rotating extends substantially to the outer periphery of the pockets and is positioned closely below the pockets, said pockets being of increasing depth successively in the direction of rotation of said cutter blade.

4. A rotary plant cutter comprising a housing adapted for movement along a line of plants to be cut, said housing when the cutter is in normal operating position having a lower open side and also having an open front and being provided with a depending flange on the sides and rear, a rotary cutter blade in the housing disposed on a vertical axis, the cutter blade operating in a plain adjacent the lower edge of said depending flange, said housing having a series of pockets therein opening downwardly and disposed in a circular path adjacent the rear end of the housing and disposed so that the cutter blade in its rotation extends substantially to the outer periphery of the pockets, said pockets each being defined on all sides by vertical wall elements, and the pockets increasing in depth successively in the direction of rotation of the cutter blade.

5. The invention set out in claim 4 wherein the pockets are defined at their outer periphery by a continuous wall element of substantially uniform depth, and being defined on their radially inner side by a depending wall element which gradually increases in depth.

6. A plant cutter comprising a housing adapted for movement along a line of plants, the housing, when the cutter is in normal operating position, having a lower open side, the cutter also including a rotary blade in the housing disposed on a vertical axis and having a length substantially equal to the transverse inner dimension of the housing, the housing have a series of downwardly opening pockets therein disposed so that the cutter blade in its rotation sweeps beneath the pockets, said pockets increasing in depth successively in the direction of rotation of the cutter blade, and the cutter blade being disposed essentially in a horizontal plane located closely adjacent the lower end of the deepest pocket and thereby spaced below the various pockets lesser distances successively in said direction of rotation.

7. The invention set out in claim 6 wherein the housing includes a depending rear flange extending across the housing at least as deep as the deepest of said pockets, and said pockets are defined at their leading side by a depending wall element of varying depth corresponding generally to the variation in depth of the pockets.

8. A plant cutter comprising a frame including a housing and adapted for movement along a line of plants, the housing being so constructed that it has, when the cutter is in operating position, a lower open side and a front end, the housing also having a depending flange extending around its sides and rear end, the cutter also including a rotary blade in the housing mounted on a vertical axis, the housing having series of downwardly opening pockets adjacent its rear end and extending thereacross, said pockets increasing in depth successively in the intended direction of rotation of the blade, said cutter blade including a central rigid bar and end cutting elements pivotally mounted on the ends of the central bar on vertical axes, the cutter blade, including the end cutting elements, being of such dimensions that the end cutting elements during rotation of the blade extend substantially to said flange and substantially covering the exposed area of said pockets.

9. A plant stalk cutter of the character disclosed comprising a frame which includes a housing adapted for movement along a line of plants, and the housing when the cutter is in such position, having a lower open side and an open front end and including a top plate element and depending flange means extending along both sides and rear, a plurality of flexible elements secured to the trailing edge of the housing and adapted to at least closely approach the ground, the cutter including a cutter blade within the housing and disposed for rotation on a vertical axis, the cutter blade having end cutter elements pivoted on vertical axes and having a length substantially equal to the transverse dimension between the side elements of the depending flange means, and the depending flange means at the rear including a wall element of circular shape having a radius only slightly greater than the radius of the cutter blade, the housing having a circular series of downwardly opening pockets therein disposed in an arc extending across the rear end of the housing, said pockets being defined at their outer periphery by said circular wall element, the housing including an inner circular depending wall element spaced radially inwardly from said first circular wall element and defining the radially inner surfaces of the pockets, the housing also including a plurality of depending vanes connected between said depending wall elements and spaced apart circumferentially, said vanes defining opposite sides, circumferentially, of the pockets, said vanes successively increasing in depth, and said inner wall element gradually increasing in depth, together in the direction of rotation of said cutter blade, whereby the pockets individually and successively increase in depth in said direction at an acute angle to said plane, said first wall element, inner wall element, and vanes, all being rigidly secured to the top plate element of the housing and rigidly secured together, whereby to provide a rigid and strong pocket structure, said cutter blade being arranged with said pivoted cutter elements operating in a horizontal plane closely adjacent the lower end of the deepest of said pockets.

References Cited

UNITED STATES PATENTS

| D. 145,836 | 10/1946 | Doyle. | |
| 2,518,093 | 8/1950 | Sutter | 56—25.4 |
| 2,968,354 | 1/1961 | Berry. | |

FOREIGN PATENTS 607,916   11/1960   Canada.

ANTONIO F. GUIDA, *Primary Examiner.*

RUSSELL R. KINSEY, *Examiner.*